US008169596B2

(12) United States Patent
Weiss et al.

(10) Patent No.: US 8,169,596 B2
(45) Date of Patent: May 1, 2012

(54) SYSTEM AND METHOD USING A MULTI-PLANE CURTAIN

(75) Inventors: Mitchell Weiss, Carlisle, MA (US); William R. Bosworth, Cambridge, MA (US)

(73) Assignee: Seegrid Corporation, Pittsburgh, PA (US)

( * ) Notice: Subject to any disclaimer, the term of this patent is extended or adjusted under 35 U.S.C. 154(b) by 286 days.

(21) Appl. No.: 12/542,279

(22) Filed: Aug. 17, 2009

(65) Prior Publication Data

US 2011/0037963 A1    Feb. 17, 2011

(51) Int. Cl.
*G01C 3/00*    (2006.01)
(52) U.S. Cl. ........................................ 356/3.1
(58) Field of Classification Search ........... 356/3.1–5.15
See application file for complete search history.

(56) References Cited

U.S. PATENT DOCUMENTS

| | | |
|---|---|---|
| 4,127,771 A | 11/1978 | Sick |
| 4,864,121 A | 9/1989 | Pietzsch |
| 4,875,761 A | 10/1989 | Fetzer |
| 5,757,501 A * | 5/1998 | Hipp ............................. 356/608 |
| 5,805,275 A * | 9/1998 | Taylor .......................... 356/3.16 |
| 6,985,212 B2 * | 1/2006 | Jamieson et al. ............ 356/5.01 |
| 7,218,385 B2 * | 5/2007 | Takagi ......................... 356/4.07 |
| 2003/0116697 A1 | 6/2003 | Kuhar |

OTHER PUBLICATIONS

Juberts Maris, NIST, Status report on next generation LADAR for driving unmanned goudn vehicles, Moibile Robots XVII, edited by Douglas W. Gage, Proceedings of SPIE vol. 5609 Belingham WA, 2004.*
International Search Report dated Apr. 27, 2011 issued in corresponding International Application No. PCT/US2010/045451.

* cited by examiner

*Primary Examiner* — Thomas Tarcza
*Assistant Examiner* — Antoine J Bedard
(74) *Attorney, Agent, or Firm* — Onello & Mello, LLP (57) ABSTRACT

A multi-plane scanner support system includes a bracket and a mirror block. The bracket is configured to be secured in a fixed orientation with respect to a scanner. And the mirror block is arranged to receive a scanning signal from the scanner and to reflect the scanning signal into a plurality of directions to create multiple scanning planes. The scanner can be a laser scanner. The scanner and multi-plane scanner support system can be attached to a material transport vehicle, for example, to provide safety functions. The vehicle can be manned or unmanned.

22 Claims, 7 Drawing Sheets

SYSTEM AND METHOD USING A MULTI-PLANE CURTAIN

FIELD OF INTEREST

The present inventive concepts relate to the field of safety scanning systems and vehicles using the same.

BACKGROUND

Material transport vehicles and systems, such as fork lift trucks, tuggers, and the like, are used in a wide variety of applications. Such vehicles can include manned vehicles and automated guided vehicles (AGVs). Some such vehicles and systems can include sensors and scanners used for navigation and safety.

Figure 1:
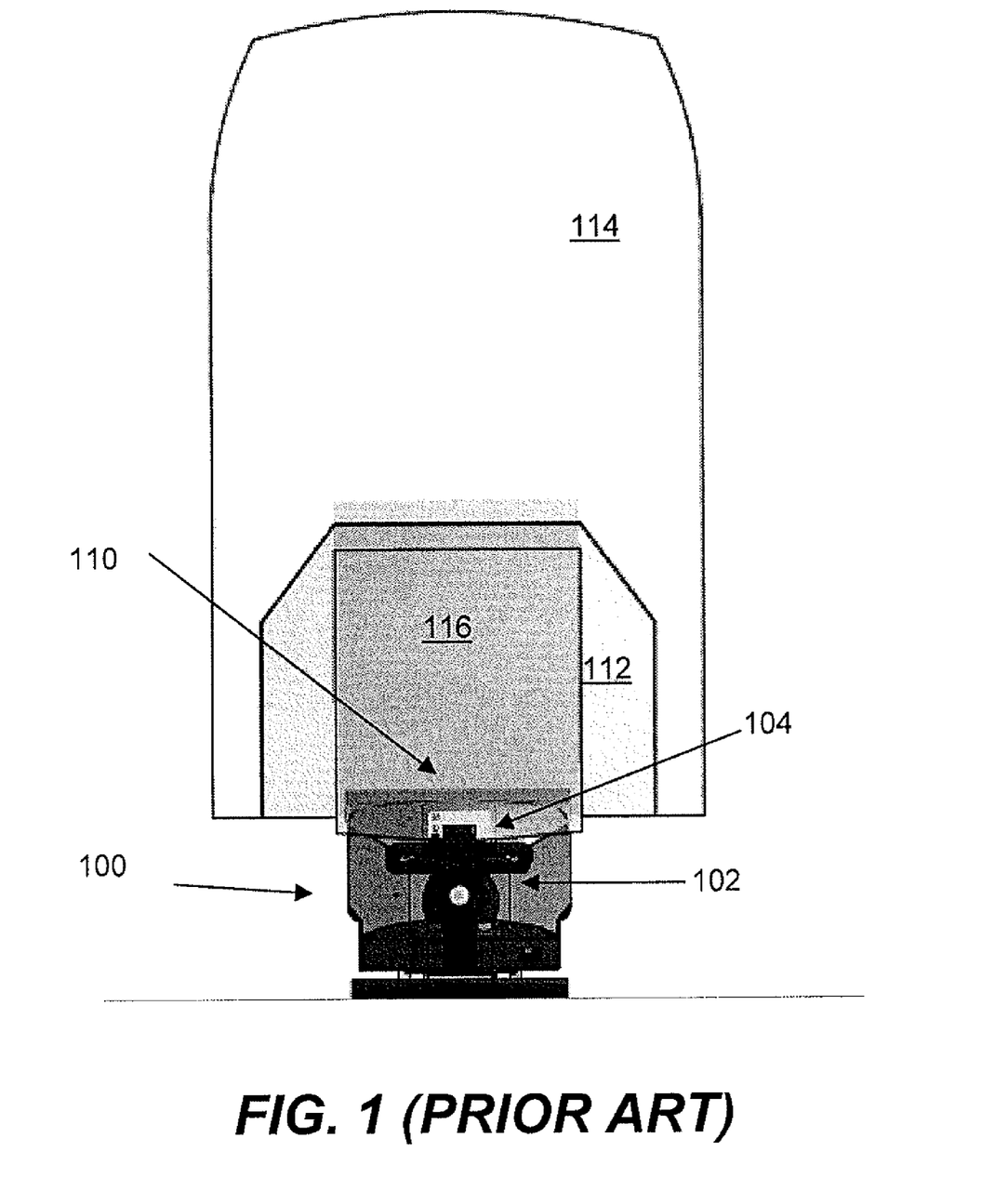
FIG. 1 is a top view of a material transport vehicle with a prior art laser range scanner system, in accordance with the prior art.
Figure 2:
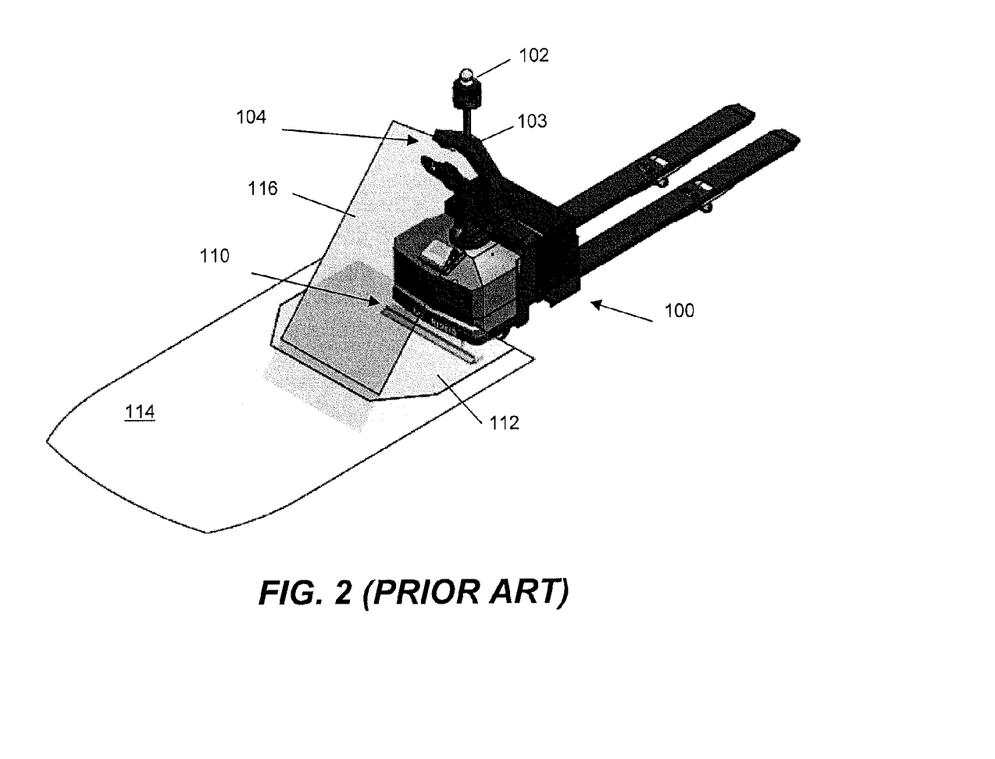
FIG. 2 is a perspective view of the prior art system of FIG. 1.

FIG. 1 is a top view and FIG. 2 is a perspective view of a material transport vehicle 100 that includes a bottom laser range scanner 110 and a laser range scanner 104 mounted near a top of the vehicle, in accordance with the prior art. Both of laser scanners 110 and 104 are used for safety.

A mast 103 can be part of or connected to vehicle 100. A light 102 is mounted on the mast 103 to communicate signals to nearby individuals, such as signals used for warning and safety purposes. The laser scanner 104 is also mounted on mast 103.

Bottom laser scanner 110 is mounted on a front portion of the vehicle 100 at a set height from a ground surface upon which the vehicle travels. The bottom laser scanner 110 projects a laser beam in front of the vehicle 100 to define two zones, a safety zone 112 and a warning zone 114. If the bottom laser scanner detects a body or object (collectively "body") in the safety zone 112 the scanner can send a signal to a controller (not shown) of the vehicle 110 which in turn communicates to the drive mechanisms (also not shown) of the vehicle 110. In response to receipt of a signal indicating detection of a body in the safety zone 112, the controller can cause the drive mechanisms to halt movement and/or operation of the vehicle. The controller can also cause light 102 to signal the presence of the condition. In this way, bottom laser scanner can be useful for providing safety relative to a body in front of the vehicle 100.

When a body detected in the warning zone 114, the bottom laser scanner 110 can send a signal to the controller. The controller, rather than halting operation, could cause the drive mechanism to slow operation and could cause the light 102 to communicate a warning signal. Such detections could also cause audible alarms to be activated.

Since the bottom laser scanner 110 projects parallel to the ground surface, objects beneath or above the plane are not detected. The use of laser scanner 104 enables the safety zone to be extended to a third dimension, because the laser scanner 104 creates a scanning plane that projects from the laser scanner 104 to about a front edge of the safety zone 112, but also below the plane of the bottom laser scanner 110 to about the ground surface. The scanning plane produced by the laser scanner 104 is referred to as a "light curtain" 116. Like bottom scanner 110, laser scanner 104 also communicates signals to the controller. The controller can exercise an algorithm for causing the appropriate warning signals and drive mechanism control. For example, the controller can determine what to do if the laser scanner 104 detected a body momentarily, but the bottom scanner 110 never detected a body.

SUMMARY

In accordance with one aspect of the present disclosure, provided is a multi-plane scanner support system. The system includes a bracket and a mirror block. The bracket is configured to be secured in a fixed orientation with respect to a scanner; and the mirror block arranged to receive a scanning signal from the scanner and to reflect the scanning signal into a plurality of directions to create multiple scanning planes.

The scanner can be a laser range scanner.

The mirror block can include a plurality of flat surface, each flat surface arranged to reflect the scanning signal to form a different one of the multiple scanning planes.

The mirror block can include a contoured reflective surface configured to form a bent light curtain comprising the multiple scanning planes.

The bracket and mirror block can be formed as a single unit.

The mirror block can include a plurality of mirrors that receive the scanning signal.

The plurality of mirrors can include machined prisms.

In accordance with another aspect of the present invention, provided is a scanning system. The system includes a range scanner, bracket, and mirror block. The bracket is configured to be secured in a fixed orientation with respect to the range scanner. And the mirror block is arranged to receive a scanning signal from the range scanner and to reflect the scanning signal into a plurality of directions to create multiple scanning planes.

The range scanner can be a laser range scanner.

The mirror block can include a plurality of flat surface, each flat surface arranged to reflect the scanning signal to form a different one of the multiple scanning planes.

The mirror block can include a contoured reflective surface configured to form a bent light curtain comprising the multiple scanning planes.

The bracket and mirror block can be formed as a single unit.

The mirror block can include a plurality of mirrors that receive the scanning signal.

The plurality of mirrors can include machined prisms.

In accordance with another aspect of the present invention, provided is a vehicle having a multi-plane scanning system. The vehicle includes a controller operatively coupled to a drive mechanism. The multi-plane scanning system includes a laser range scanner coupled to the controller; a bracket configured to be secured in a fixed orientation with respect to the laser range scanner; and a mirror block arranged to receive a scanning signal from the laser range scanner and to reflect the scanning signal into a plurality of directions to create multiple scanning planes. The laser range scanner is configured to receive a signal from the multiple scanning planes, communicate the signal to the controller as a detection signal, and the controller modifies operation of the vehicle in response to the detection signal.

The mirror block can include a plurality of flat surface, each flat surface arranged to reflect the scanning signal to form a different one of the multiple scanning planes.

The mirror block can include a contoured reflective surface configured to form a bent light curtain comprising the multiple scanning planes.

The bracket and mirror block can be formed as a single unit.

The mirror block can include a plurality of mirrors that receive the scanning signal.

The plurality of mirrors can include machined prisms.

The vehicle can be an unmanned vehicle.

The vehicle can further include a bottom scanner that projects a safety zone and is also coupled to the controller, wherein the safety zone and at least one of the multiple planes intersect.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Figure 3:
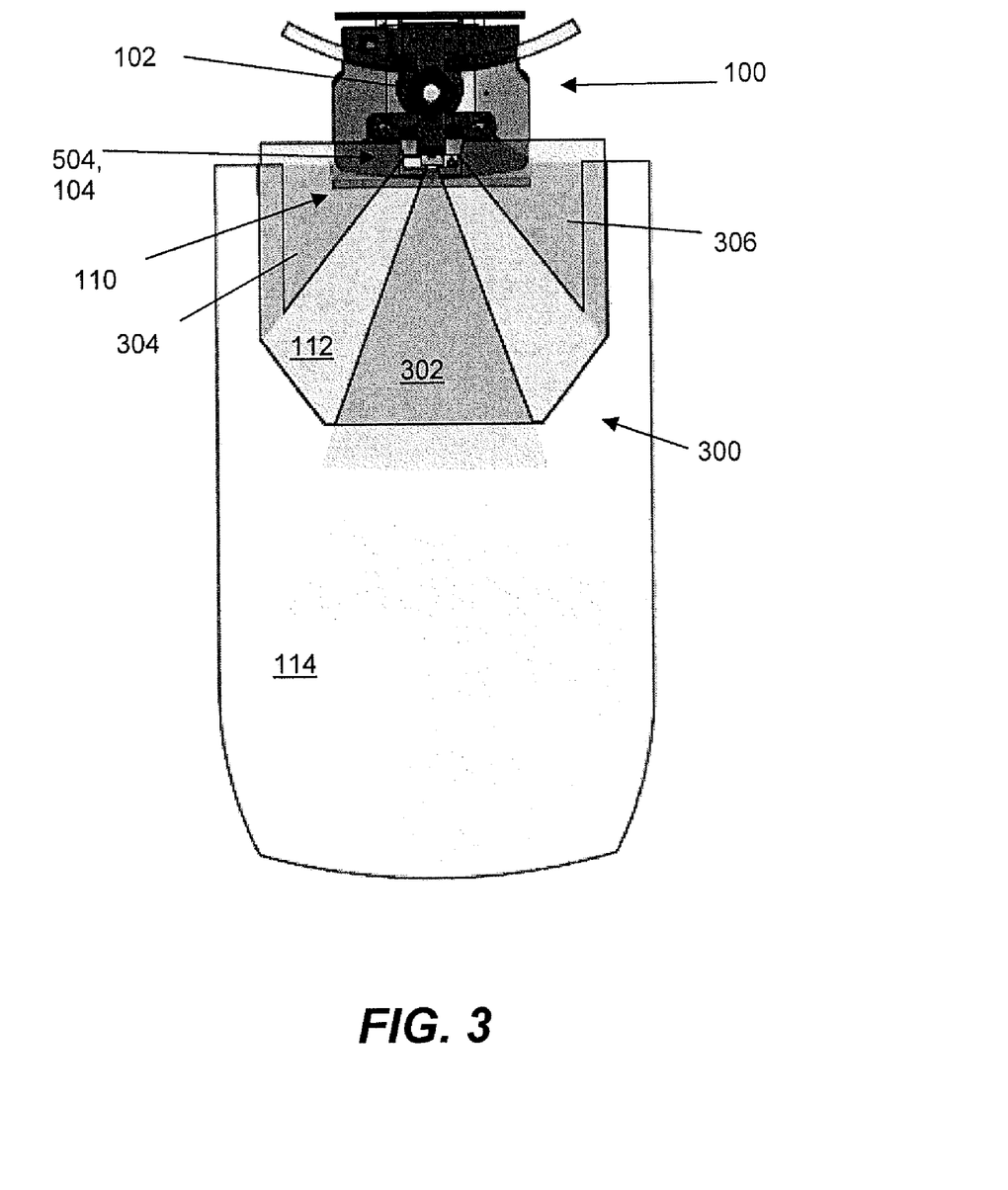
FIG. 3 is a top view of a material transport vehicle with an embodiment of a multi-plane laser range scanner system, in accordance with the present invention.
Figure 4:
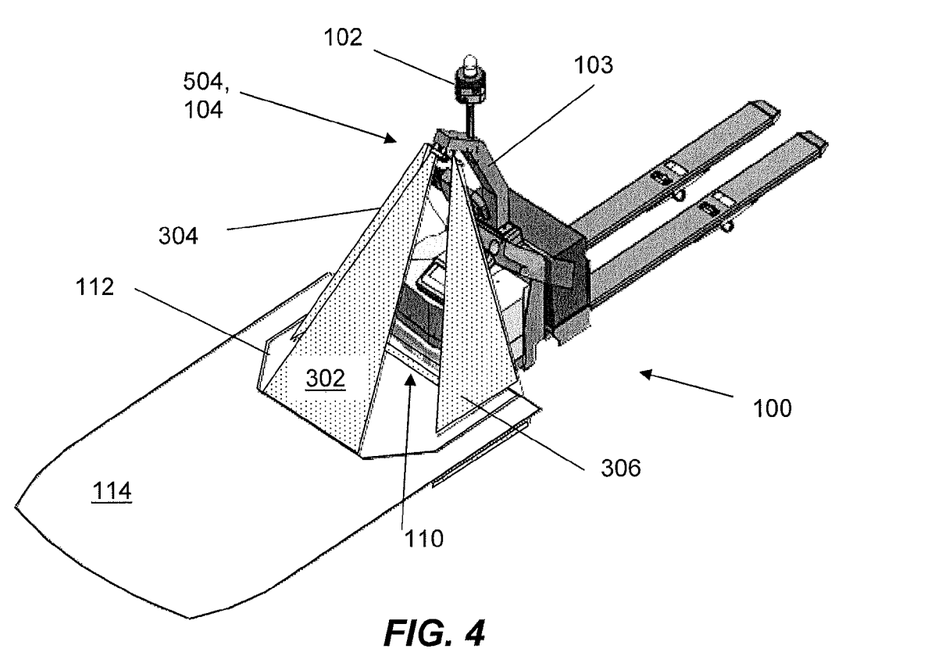
FIG. 4 is a perspective view of the system of FIG. 2, in accordance with aspects of the present invention.

FIG. 3 shows a top view of a material transport vehicle 100 including multi-plane scanner support system 504 and scanner 104 in accordance with aspects of the present invention. FIG. 4 provides a perspective view of the same arrangement. As in FIGS. 1 and 2, a bottom laser range scanner 110 is includes that projects a safety zone 112 and a warning zone 114. And a mast 103 is included with a light mounted thereto.

In this embodiment, multi-plane scanner support system 504 and laser scanner 104 are also mounted to mast 103. Vehicle 100 includes a controller (not shown) to which laser scanner 104 and bottom laser scanner 110 are coupled. And the controller is coupled to a vehicle drive mechanism (not shown) that controls the operation of the vehicle. The controller is also coupled to light 102, as described with respect to FIGS. 1 and 2 previously described.

Unlike the prior art, the multi-plane scanner support system is mounted relative to the scanner 104 such a light curtain 300 having multiple scanning planes 302, 304, and 306, is generated from the single laser 104. That is, typical lasers used scan a field of view of up to about 270 degrees. In the present invention, one or more reflective surfaces of the multi-plane scanner support receive the scanning signal in different portions of its scan to create multiple scanning planes 302, 304, and 306. A practical benefit of such an approach with material transport vehicles is that it enables safety zone extension and detection to the front right and left areas of the vehicle. This can be extremely useful, for example, when an AGV is navigating around a corner—which are not covered by traditional safety zones and in FIGS. 1 and 2.

In FIG. 3, light curtain 300 comprises three relatively discrete scanning planes 302, 304 and 306, but in other embodiments a contoured light curtain can be formed using a contoured multi-plane scanner support system 504.

In the illustrative embodiment, laser range scanner is a S100 laser range scanner by SICK, Inc. of Waldkirch, Germany. Although the LSM100, S300, and S3000 models are other examples of a suitable laser range scanner, also by SICK, Inc. The laser scanner points about 34 degrees above horizontal and about 66 inches above the ground surface. The front plane 302 has a field ground projection of about 1100 mm from the front of the vehicle 100 and the side planes 304, 306 have field ground projections of about 800 mm from the center of the front of the vehicle 100. These are example, specific dimensions can differ depending, for example, on the vehicle.

Figure 5A:
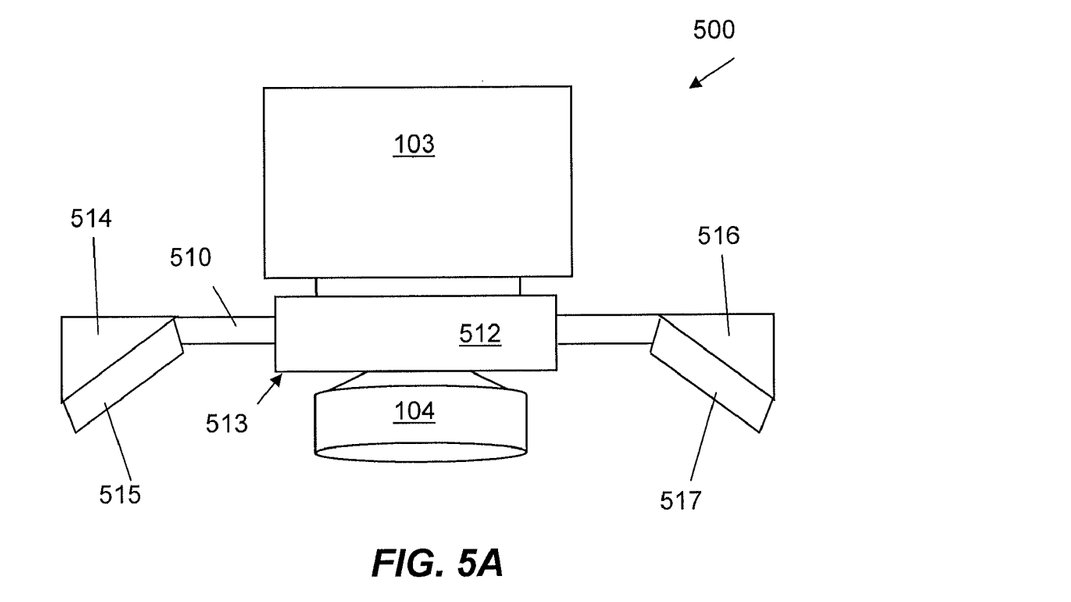
FIGS. 5A-5C are different views of an embodiment of a laser range scanner and mirror system, in accordance with aspects of the present invention.
Figure 5B:
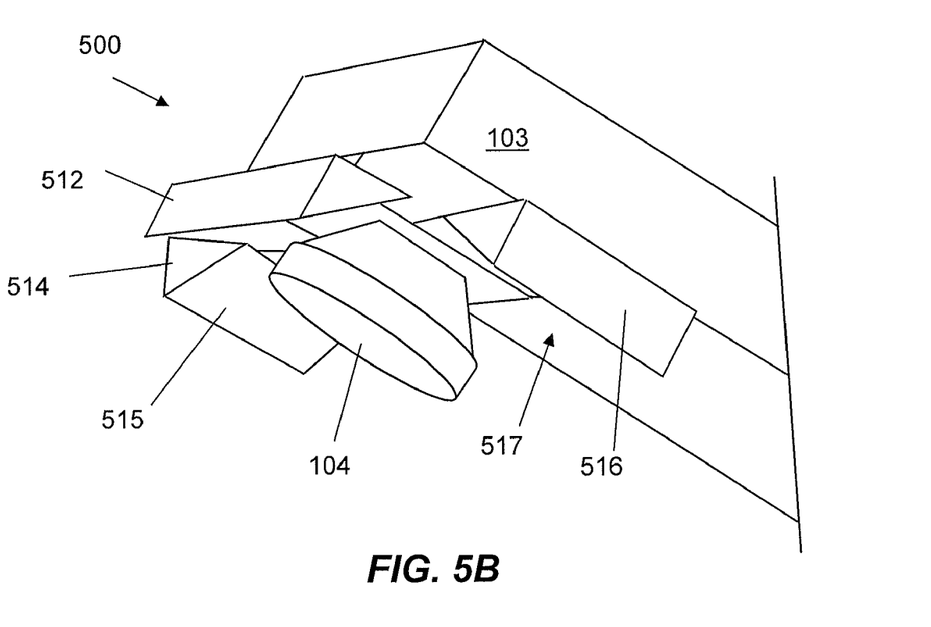
Figure 5C:
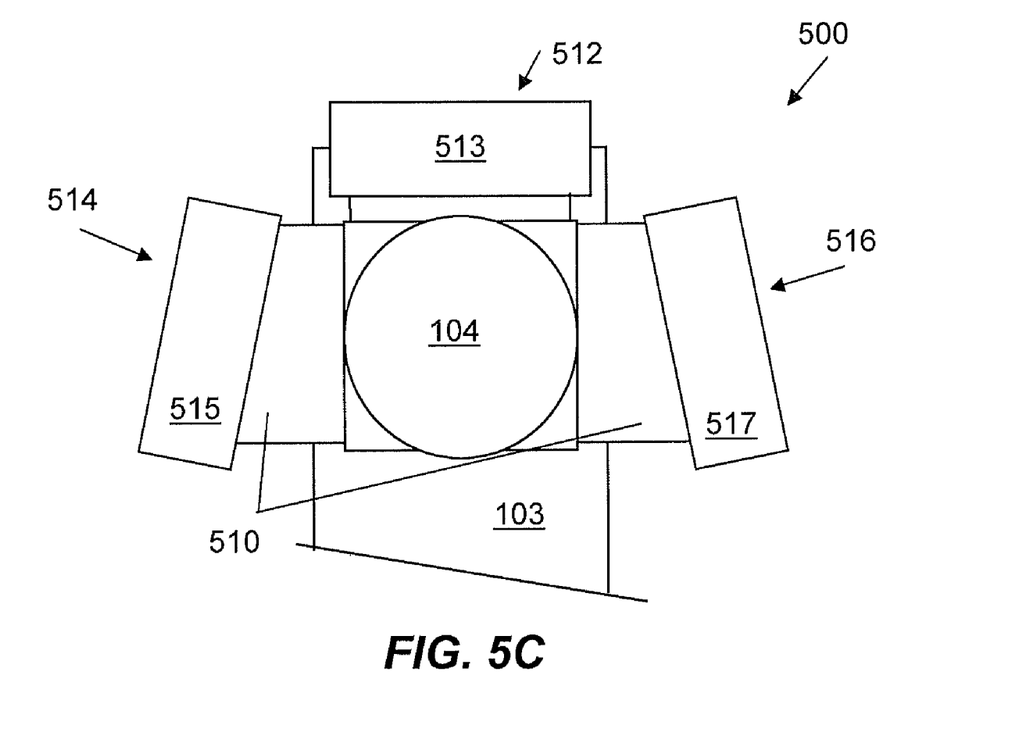

FIGS. 5A-5C are different views of an embodiment of a laser range scanner and mirror system, in accordance with aspects of the present invention;

In FIGS. 5A-5C an embodiment of scanning system 500 is shown that uses multi-plane scanner support system 504 and scanner 104 attached to mast 103, as discussed above. Multi-plane scanner support system 504 includes a bracket 510 that has the laser disposed therein, so that reflective surfaces attached to the bracket 510 reflect the laser beam of laser scanner 104 during operation. In this embodiment, those reflective surfaces are comprised of three mirror blocks 512, 514, 516 attached to bracket 510. Each mirror block includes a reflective surface 513, 515, 517 that receives a scanning signal from the laser 104. Each of reflective surfaces 513, 515, 517 is used to form a respective scanning plane. For example, surface 513 reflects the laser scanning beam along scanning plane 302, reflective surface 515 reflects the laser scanning beam along scanning plane 304, and reflective surface 517 reflects the laser scanning beam along scanning plane 306 in FIGS. 3 and 4.

Figure 6A:
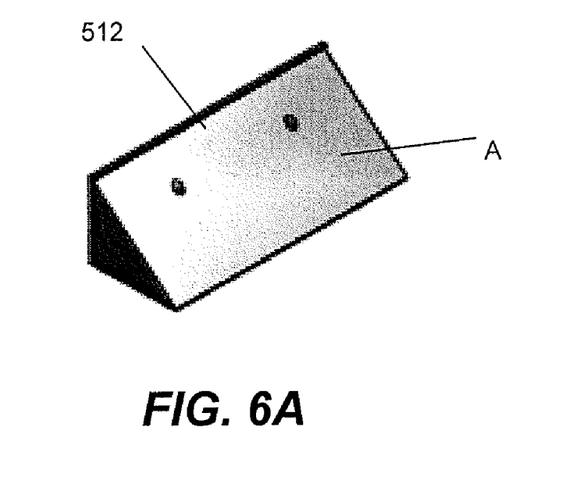
FIG. 6A is a perspective view of an embodiment of a mirror block, in accordance with aspects of the present invention.
Figure 6B:
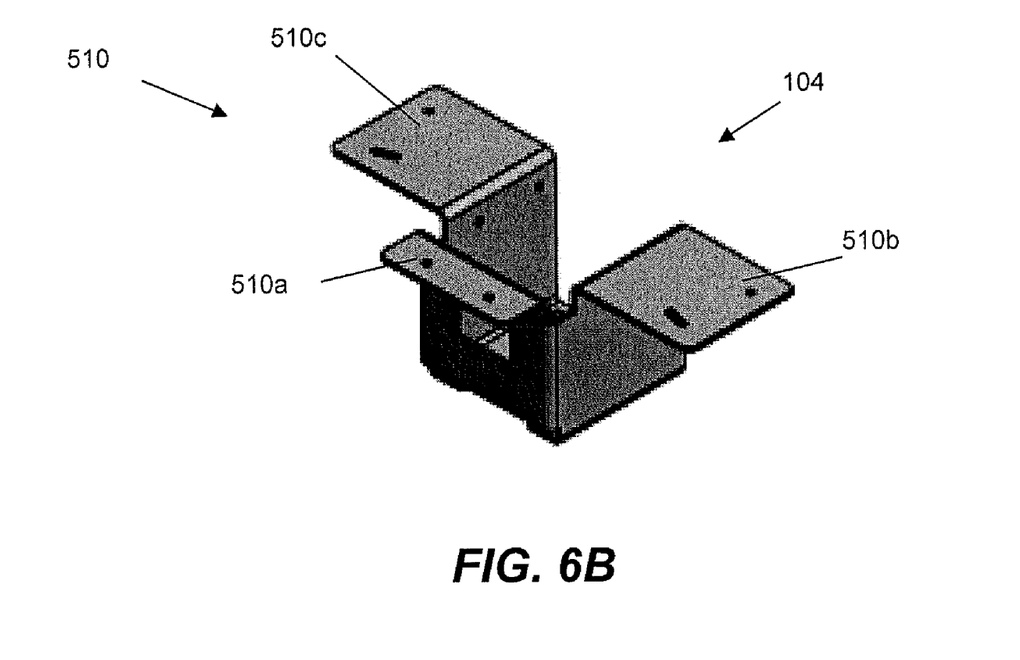
FIG. 6B is a perspective view of an embodiment of a bracket that can be used to support the mirror block of FIG. 6A, in accordance with aspects of the present invention.

FIG. 6A is a perspective view of an embodiment of mirror block 512 and FIG. 6B is a perspective view of an embodiment of a bracket 510 of FIGS. 5A-5C. In this embodiment, reflective surface 513 (not shown in FIG. 6A) would be attached to a surface A of mirror block 512. The reflective surface could take any of a variety of forms, such as a plate made from polished or machined metal or other material (e.g., glass). Mirror block 512 is mounted to surface 510*a* of bracket 510, shown in FIG. 6B. Similarly, mirror block 514 would be mounted to surface 510*b* and mirror block 516 would be mounted to surface 510*c*.

In some embodiments, two or more of bracket 510, mirror blocks 512, 514, 516 and reflective surfaces 513, 515, 517 can be made of a single material or compound. I some embodiments, a contoured reflective surface could be used to form a bent light curtain, again having multiple planes. For example, concave curves, convex curve, bends, warps, prisms etc can be used to tailor the light curtain to have the desired number and shaped plurality of scanning planes.

The present embodiments achieve multiple planes without "nodding" mechanisms, are less expensive to make and maintain.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A multi-plane scanner support system, comprising:
a bracket configured to be secured in a fixed orientation with respect to a scanner; and
a mirror block coupled to the bracket and external to the scanner, the mirror block having multiple reflective surfaces arranged to receive a scanning signal output from the scanner and to reflect the scanning signal into a plurality of directions to create multiple scanning planes.

2. The system of claim 1, wherein the scanner is a laser range scanner.

3. The system of claim 1, wherein the mirror block includes a plurality of flat surface, each flat surface arranged to reflect the scanning signal to form a different one of the multiple scanning planes.

4. The system of claim 1, wherein the mirror block includes a contoured reflective surface configured to form a bent light curtain comprising the multiple scanning planes.

5. The system of claim 1, wherein the bracket and mirror block are formed as a single unit.

6. The system of claim 1, wherein the mirror block includes a plurality of mirrors that receive the scanning signal.

7. The system of claim 6, wherein the plurality of mirrors includes machined prisms.

8. A scanning system, comprising:
a range scanner;
a bracket configured to be secured in a fixed orientation with respect to the range scanner; and
a mirror block coupled to the bracket and external to the scanner, the mirror block having multiple reflective surfaces arranged to receive a scanning signal output from the range scanner and to reflect the scanning signal into a plurality of directions to create multiple scanning planes.

9. The system of claim 8, wherein the range scanner is a laser range scanner.

10. The system of claim 8, wherein the mirror block includes a plurality of flat surface, each flat surface arranged to reflect the scanning signal to form a different one of the multiple scanning planes.

11. The system of claim 8, wherein the mirror block includes a contoured reflective surface configured to form a bent light curtain comprising the multiple scanning planes.

12. The system of claim 8, wherein the bracket and mirror block are formed as a single unit.

13. The system of claim 8, wherein the mirror block includes a plurality of mirrors that receive the scanning signal.

14. The system of claim 13, wherein the plurality of mirrors includes machined prisms.

15. A vehicle having a multi-plane scanning system, comprising:
a controller operatively coupled to a drive mechanism;
a laser range scanner coupled to the controller;
a bracket configured to be secured in a fixed orientation with respect to the laser range scanner; and
a mirror block coupled to the bracket and external to the scanner, the mirror block having multiple reflective surfaces arranged to receive a scanning signal output from the laser range scanner and to reflect the scanning signal into a plurality of directions to create multiple scanning planes,
wherein the laser range scanner is configured to receive a signal from the multiple scanning planes, communicate the signal to the controller as a detection signal, and the controller modifies operation of the vehicle in response to the detection signal.

16. A vehicle having a multi-plane scanning system, comprising:
a controller operatively coupled to a drive mechanism;
a laser range scanner coupled to the controller;
a bracket configured to be secured in a fixed orientation with respect to the laser range scanner; and
a mirror block arranged to receive a scanning signal from the laser range scanner and to reflect the scanning signal into a plurality of directions to create multiple scanning planes, wherein the mirror block includes a plurality of flat surfaces, each flat surface arranged to reflect the scanning signal to form a different one of the multiple scanning planes,
wherein the laser range scanner is configured to receive a signal from the multiple scanning planes, communicate the signal to the controller as a detection signal, and the controller modifies operation of the vehicle in response to the detection signal.

17. A vehicle having a multi-plane scanning system, comprising:

a controller operatively coupled to a drive mechanism;
a laser range scanner coupled to the controller;
a bracket configured to be secured in a fixed orientation with respect to the laser range scanner; and
a mirror block arranged to receive a scanning signal from the laser range scanner and to reflect the scanning signal into a plurality of directions to create multiple scanning planes, wherein the mirror block includes a contoured reflective surface configured to form a bent light curtain comprising the multiple scanning planes,
wherein the laser range scanner is configured to receive a signal from the multiple scanning planes, communicate the signal to the controller as a detection signal, and the controller modifies operation of the vehicle in response to the detection signal.

18. The vehicle of claim 15, wherein the bracket and mirror block are formed as a single unit.

19. The vehicle of claim 15, wherein the mirror block includes a plurality of mirrors that receive the scanning signal.

20. The vehicle of claim 19, wherein the plurality of mirrors includes machined prisms.

21. The vehicle of claim 15, wherein the vehicle is an unmanned vehicle.

22. A vehicle having a multi-plane scanning system, comprising:
a controller operatively coupled to a drive mechanism;
a laser range scanner coupled to the controller;
a bracket configured to be secured in a fixed orientation with respect to the laser range scanner;
a mirror block arranged to receive a scanning signal from the laser range scanner and to reflect the scanning signal into a plurality of directions to create multiple scanning planes; and
a bottom scanner that projects a safety zone and is also coupled to the controller, wherein the safety zone and at least one of the multiple planes intersect,
wherein the laser range scanner is configured to receive a signal from the multiple scanning planes, communicate the signal to the controller as a detection signal, and the controller modifies operation of the vehicle in response to the detection signal.

* * * * *